US006736318B2

(12) United States Patent
Reichardt et al.

(10) Patent No.: US 6,736,318 B2
(45) Date of Patent: May 18, 2004

(54) SMART-CARD READER INCLUDING MECHANICAL LOCKING MEANS

(75) Inventors: Manfred Reichardt, Weinsberg (DE); Olga Kaiser, Heilbronn (DE)

(73) Assignee: Amphenol-Tuchel Electronics GmbH (DE)

( * ) Notice: Subject to any disclaimer, the term of this patent is extended or adjusted under 35 U.S.C. 154(b) by 287 days.

(21) Appl. No.: 09/899,272

(22) Filed: Jul. 6, 2001

(65) Prior Publication Data

US 2002/0003476 A1 Jan. 10, 2002

(30) Foreign Application Priority Data

Jul. 7, 2000 (DE) .......................................... 100 33 127
Dec. 7, 2000 (DE) .......................................... 100 60 933

(51) Int. Cl.[7] ............................................... G06K 7/06
(52) U.S. Cl. ....................... 235/441; 235/486; 439/327; 439/822; 439/838; 439/863
(58) Field of Search ................................ 235/439, 441, 235/451, 486, 475, 482, 449; 361/737, 801; 439/729, 819, 820, 822, 835, 838, 863, 159, 327; 340/572.8, 572.9

(56) References Cited

U.S. PATENT DOCUMENTS

| | | | | | |
|---|---|---|---|---|---|
| 4,814,593 | A | * | 3/1989 | Reichardt et al. | 235/482 |
| 5,331,144 | A | * | 7/1994 | Shima et al. | 235/486 |
| 6,138,916 | A | * | 10/2000 | Zolkos et al. | 235/475 |
| 6,341,727 | B1 | * | 1/2002 | Canard et al. | 235/486 |
| 6,367,700 | B1 | * | 4/2002 | Kanayama et al. | 235/475 |
| 6,382,508 | B1 | * | 5/2002 | Bleier | 235/441 |
| 6,643,125 | B2 | * | 11/2003 | Nabetani et al. | 439/159 |
| 6,652,299 | B2 | * | 11/2003 | Sato | 439/159 |
| 6,655,972 | B2 | * | 12/2003 | Sato | 439/159 |
| 2001/0008815 | A1 | * | 7/2001 | Zuin | 439/327 |

FOREIGN PATENT DOCUMENTS

| | | |
|---|---|---|
| DE | 35 18 247 | 11/1986 |
| DE | 195 13 359 | 6/1997 |
| EP | 0 167 356 | 1/1986 |
| JP | 11-242722 A * | 9/1999 |

* cited by examiner

Primary Examiner—Jared J. Fureman
(74) Attorney, Agent, or Firm—Blank Rome LLP

(57) ABSTRACT

A smart-card reader is disclosed for receiving and locking a smart-card in a locking position. The smart-card reader comprises: a housing, a contacting apparatus, the contact elements of which are adapted to contact respective card contacts of the smart-card when the smart-card is in the reading position in the housing. A mechanical locking means for locking and releasing the smart-card. The mechanical locking means comprises a locking slide and a locking lever mechanism. The locking slide extends along and outside of the housing. The locking lever mechanism is located in front of the contacting apparatus when looking in the direction of the card insertion. The locking mechanism is also arranged above the smart-card and is adapted to lock the locking slide in the reading position.

28 Claims, 7 Drawing Sheets

SMART-CARD READER INCLUDING MECHANICAL LOCKING MEANS

TECHNICAL FIELD

The invention relates to a smart-card reader, also called a chip card reader, for contacting smart-cards, also called chip cards, i.e. the card contacts which are present on a smart-card.

BACKGROUND ART

DE 3810275 C3 describes a smart-card reader having a stationary frame. In an opening of said frame a movable contact support is reciprocally mounted between an initial position and a reading position. For this smart-card reader the insertion of the smart-card as well as the movement of the smart card between the initial position and the reading position and back to the initial position as well as the removal of the smart-card out of the smart-card reader occurs according to the push-pull principle.

DE 19513359 C1 discloses another smart-card reader operating according to the so-called pushmatic principle. The latter smart-card reader comprises a housing within which a contact support is reciprocally mounted. A locking or latching member is provided to lock the smart-card in the smart-card reader in the reading position by an engagement with the smart-card. The locking member comprises an L-shaped arm which is mounted on a follower element on the side of the housing. The follower element is carried along with the smart-card on its way to the reading position, wherein the arm is guided such that it is moved from a position outside of a guide path and along an inclined surface such that a short L-leg of the arm comes into engagement with the smart-card in the reading position, wherein the follower element is releasably secured by a blocking member in the reading position of the smart-card. The known designs of smart-card readers have a relatively high total height and numerous components are required. As a result, the costs are high and it is further difficult to install a smart-card reader of the prior art in an apparatus where it is to be used.

DISCLOSURE OF THE INVENTION

The invention as specified in claim 1 advantageously reduces the dimensions of the chip card reader and intends to simplify the mechanical locking means so as to obtain a very flat design having an increased reliability.

Thus, the disadvantages of the prior art are avoided by the present invention, which provides for a chip or smart-card reader as set forth in claim 1. Preferred embodiments of the invention are disclosed in the dependent claims.

The smart-card reader of the invention comprises locking means for holding the smart-card in a reading position within the smart-card reader. Diverse functions required in connection with the locking and de-locking of the smart-card are integrated in a locking lever (also called universal lever), which is part of a locking lever mechanism. Further, the mechanical locking means is partially located along and outside of the housing of the smart-card reader and in front of the card contacts such that an extremely flat design of the smart-card reader is obtained.

BRIEF DESCRIPTION OF THE DRAWINGS

An embodiment of the invention is disclosed in the drawings and will be described in detail below. In the drawing.

BEST MODE FOR CARRYING OUT THE INVENTION

FIGS. 1 to 7 disclose an embodiment of the present invention.

Figure 1:
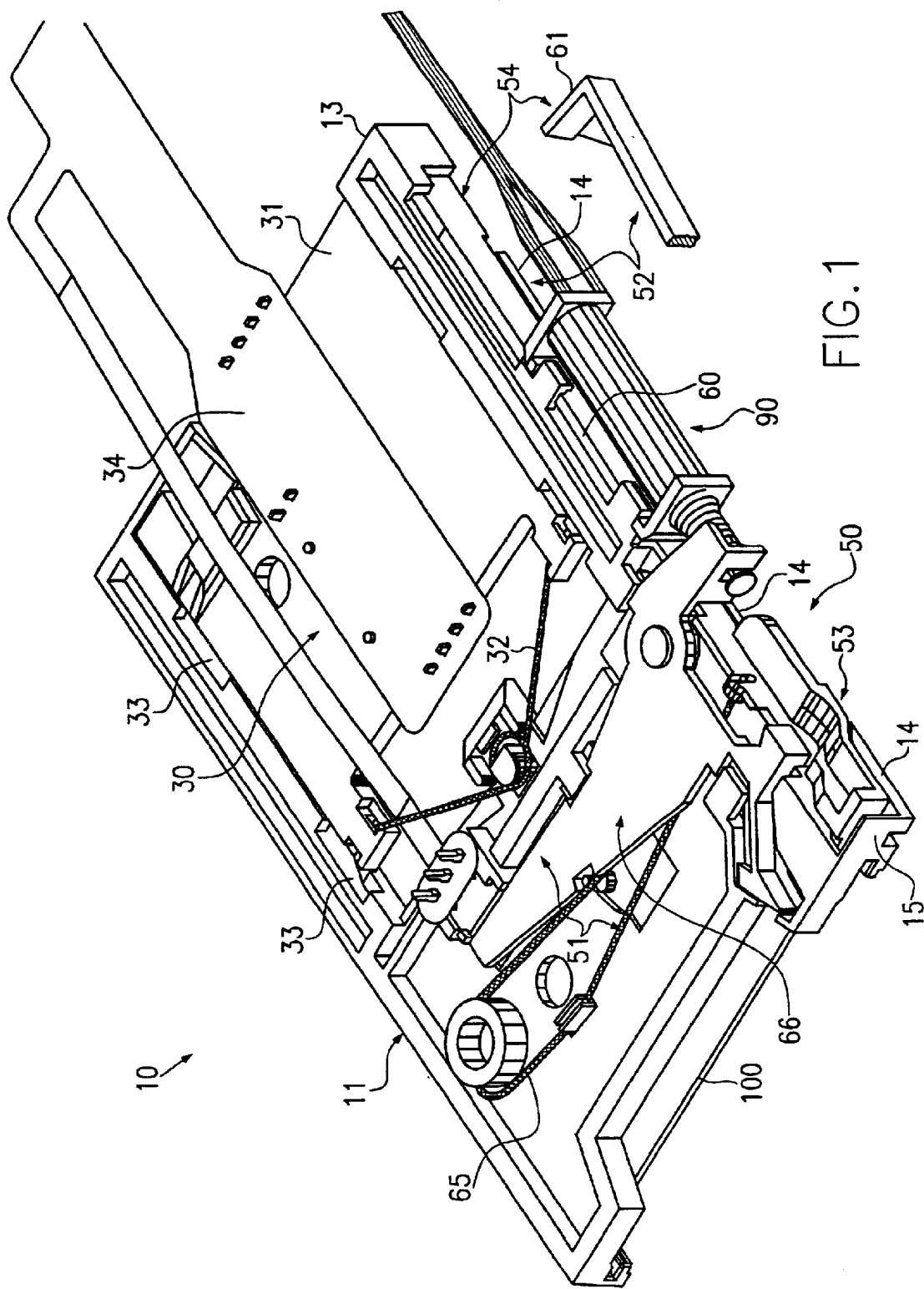
FIG. 1 is a perspective view of a first embodiment of a smart-card reader according to the invention.
Figure 3:
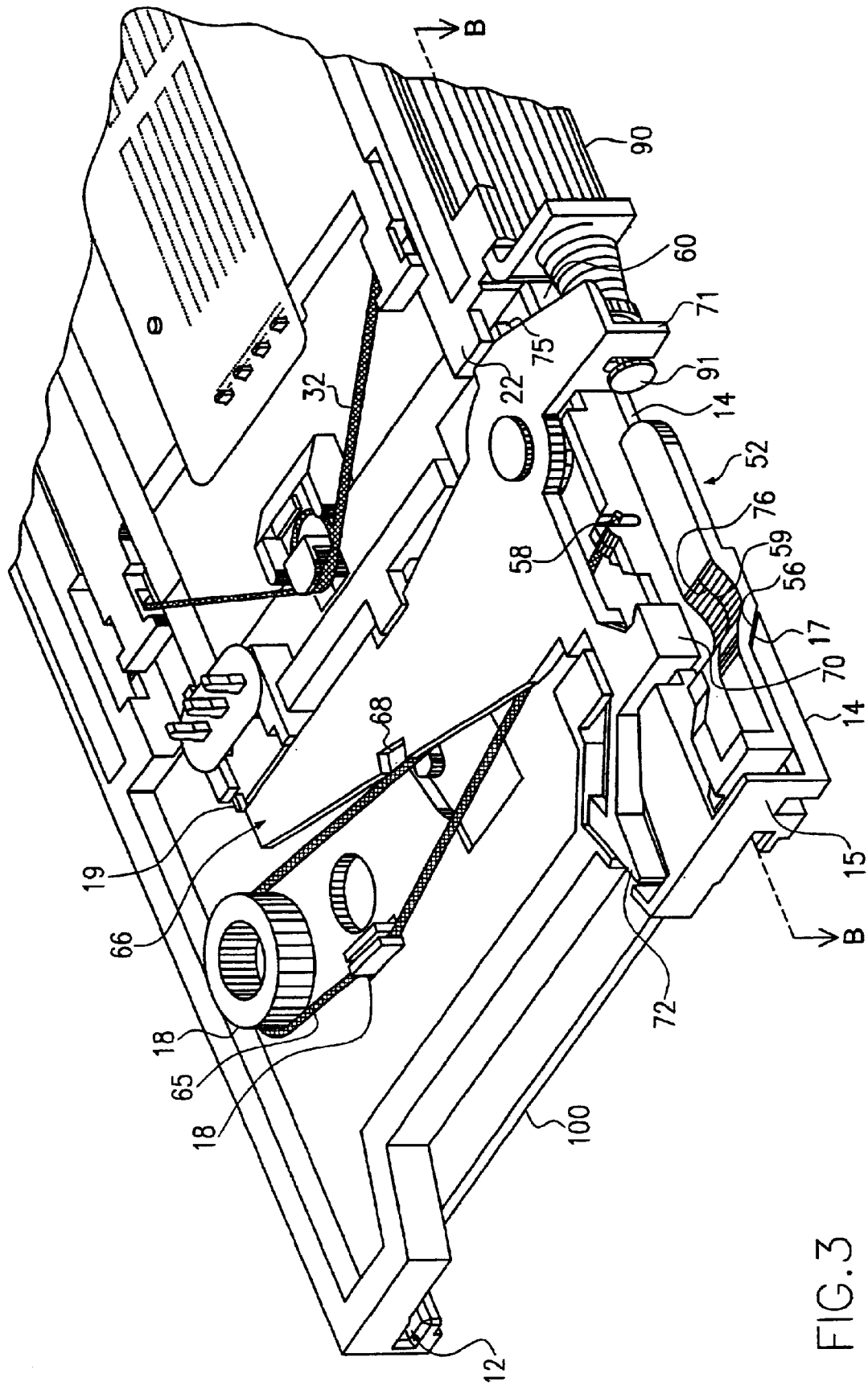
FIG. 3 is a view similar to FIG. 2 where the smart-card is in its reading position.
Figure 4:
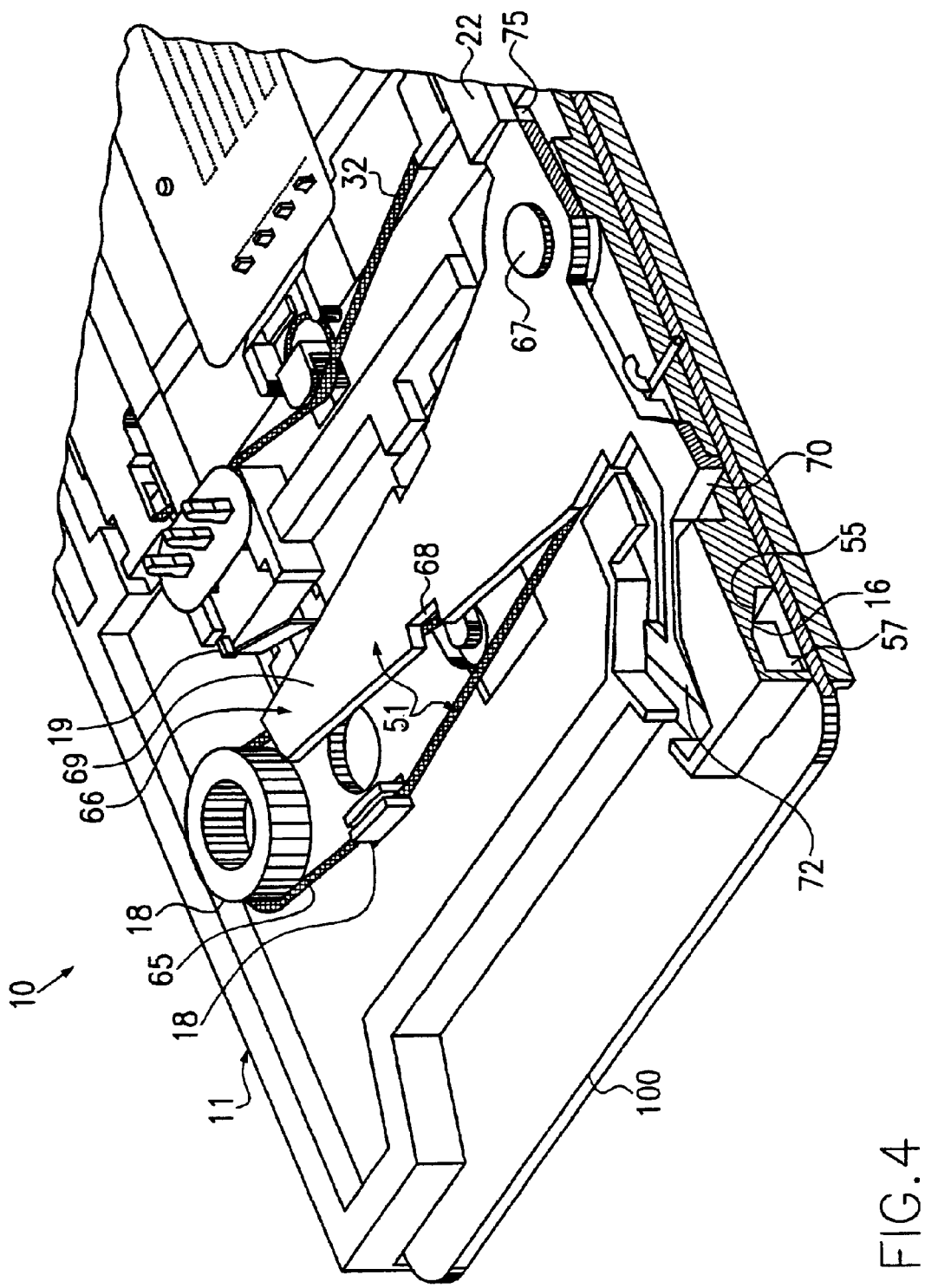
FIG. 4 is a perspective partially sectional view similar to FIG. 2 with the section line being A—A in FIG. 2, wherein the smart-card is again in its released position.
Figure 5:
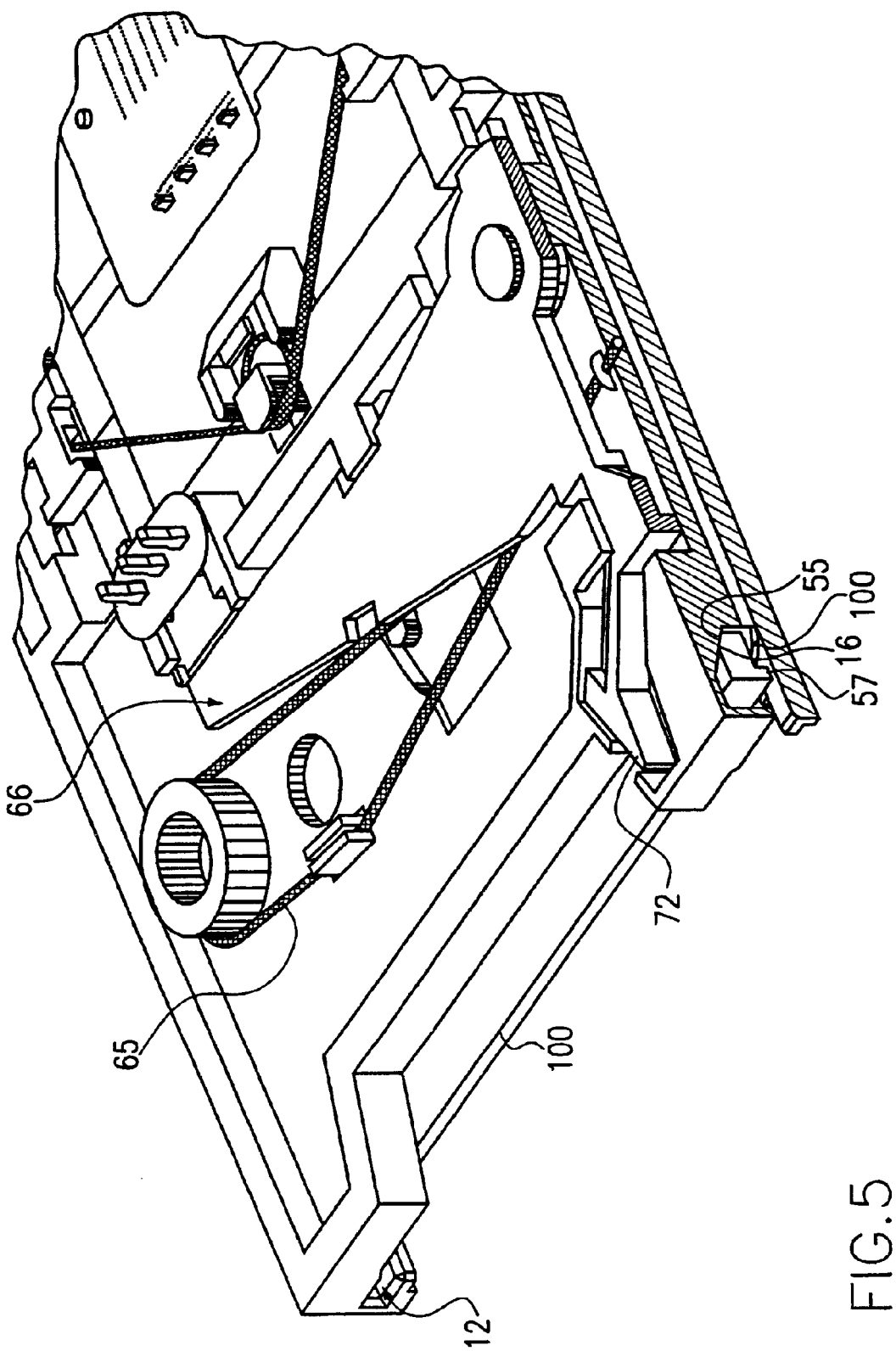
FIG. 5 is a sectional view along line B—B in FIG. 3 and similar to FIG. 4, wherein the chip card is, however, placed in its reading position.

According to FIG. 1 a smart-card reader 10 of the invention comprises a housing 11, a contacting apparatus 30 and a mechanical locking means 50. Preferably, the mechanical locking means 50 can be actuated by a release solenoid 90, which is also a component of the smart-card reader 10. A smart-card 100 can be inserted into the housing 11 from the frontal end thereof. For this purpose the housing 11 forms a card guide path 12 (FIG. 3). If the smart-card 100 is inserted furthest into the housing 11, then the smart-card is located in a reading position. As will be explained below, the smart-card 100 is locked in the reading position with the consequence that the reading position can also be called the locking position. In the reading position, the contacting apparatus 30 provides for an electrical contact to the smart-card contacts which are located on the smart-card 100.

In FIG. 1 it is shown that for the preferred embodiment of the invention the smart-card reader 10 uses a contacting apparatus 30 similar to the contact apparatus shown in DE OS 3810275. In accordance with the present invention the mechanical locking means 50 is placed oppositely to the contacting apparatus 30 as a flat component, i.e. the mechanical locking means 50 is in front of the contacting apparatus 30. However, parts of the mechanical locking means 50 are also outside of the guide path 12 and alongside the housing 11.

The Contacting Apparatus 30

FIG. 1 discloses that the contacting apparatus 30 comprises a contact support 31 which is reciprocally mounted in the housing 11 and can be moved in the direction of the card insertion against the force of a restoring spring 32. The movement of the contact support 31 in the housing 11 is guided by means of guide elements 33 such that during the insertion of the smart-card 100 into the housing 11 the contact support 30 is moved and simultaneously lowered, such that the contact elements shown with dashed lines of the contact support 31 provide for a connection to the card contacts of the smart-card 100. It is noted that the contact elements shown in dashed lines are covered by a conductor foil 34 comprising conductors. The restoring spring 32 biases the contact support 31 into its initial position such that the contact support 31 will return to its initial position when the smart-card 100 is removed.

The Mechanical Locking Means 50

The mechanical locking means 50 is preferably located in the same housing 11 as is the contacting apparatus 30. The mechanical locking means 50 comprises a locking lever mechanism 51 which is located with respect to the direction of the insertion of the smart-card 100 in front of the contacting apparatus 30 and above the smart-card 100. Moreover, the mechanical locking means 50 comprises a locking slide 52 which extends alongside and outside of the housing 11. The locking slide 52 is slideable mounted at the housing 11 and locks the smart-card 100 in its reading position.

Moreover, alongside and outside of the housing 11 the release solenoid or magnet 90 is mounted at the housing 11. The release solenoid 90 can be electrically actuated so as to release the mechanical locking means 50 of the smart-card reader 10 so that the smart-card 100 can be moved into its release position.

The Locking Slide 52 of the Mechanical Locking Means 50

Figure 2:
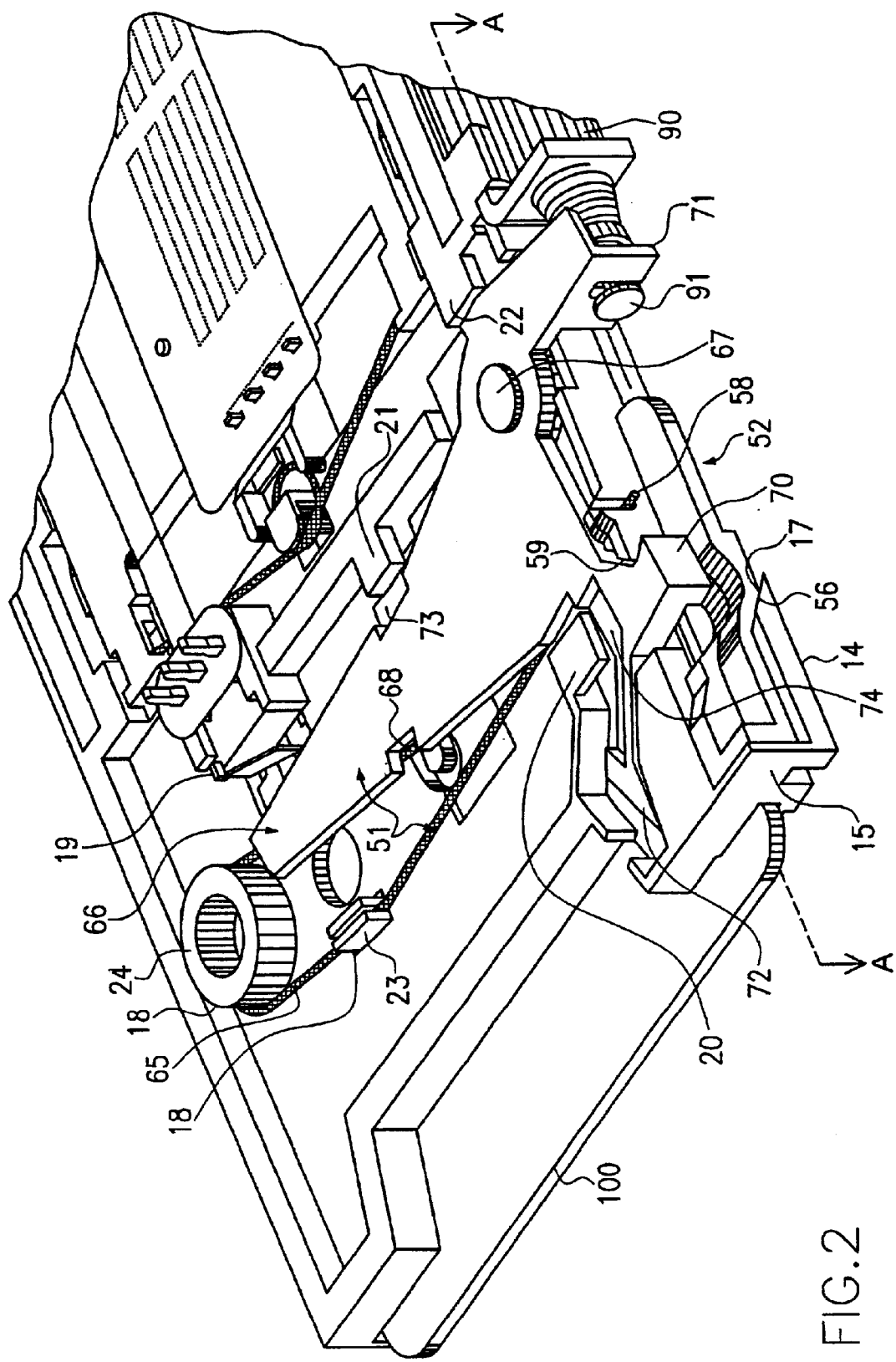
FIG. 2 is an enlarged partial view of a front portion of the smart-card reader of FIG. 1 wherein the smart-card is located in a released or initial position.

In particular FIGS. 1 and 2 show the locking slide 52 as an elongated single piece element which extends substantially sideways along the housing 11.

The locking slide 52 comprises a forwardly located front portion 53 close to the location where the card is inserted, and a back portion 54 close to the end of the smart-card reader 10. Front portion 53 and back portion 54 are connected by a flat rod member. The flat rod member 60 extends in particular between the housing 11 and the release solenoid 90. At the rear or back portion 54 of the locking slide 50 a card receiving means 61 is shown (see the details of the back portion 54 of the locking slide 52 in FIG. 1).

As far as the operation is concerned it is noted that then, when the smart-card 100 is almost completely inserted into the housing 11, the smart-card 100 comes in engagement with a perpendicular abutment of the card receiving means 61 and, as a consequence, the smart-card 100 moves the locking slide 52 relative to the housing 11 along the direction of the inserted smart-card 100.

At its rear portion the housing 11 comprises a locking slide guide element 13 (FIG. 1) (also called a guide element for the locking slide) restricting the inward movement of the locking slide 52. The housing 11 further comprises along its longitudinal side, guide surfaces 14 for the locking slide 52, and at its forward end the housing 11 comprises a locking slide stop 15. The guide element 13, the guide surfaces 14 and the stop 15 receive the locking slide 52 and guide the locking slide 52 for its relative movement with respect to the housing 11.

Further, at the forward end of the housing 11 a first and a second inclined guide surface 16 and 17 are provided which co-operate or are in abutment with respective first and second inclined surfaces 55 and 56 of the locking slide 52. At the forward end of the locking slide 52 a card locking means 57 is located, preferably in the form of a flange. When the card 100 is inserted into the smart-card reader 10 such that the inwardly located, i.e. the rearward end of the card 100 comes into engagement with the card receiving means 61 and, thereby, moves the locking slide 52, then the first pair of inclined surfaces 16, 55 guides the locking slide 52 into a small downward movement, whereby the card locking means 57 of the locking slide 52 is guided behind the forward or front end of the inserted card 100 and thus locks the card 100. I.e. a movement of the chip card 100 in a direction opposite to the direction of insertion is made impossible.

The locking lever mechanism 51 further comprises a resilient element 65, for instance a spring, in particular a wire spring 65. By means of said resilient element 65 the locking slide 52 is biased into a card releasing position, i.e. into a forward position. In case the mechanical locking means 50 is released by the releasing solenoid 90 (or by hand) the locking slide 52 will move back (i.e. opposite to the direction of insertion) to its initial position, whereby the second pair of inclined surfaces 17 and 56 provides for a small upward movement of the locking slide 52, whereby the card locking means 57 is lifted and the card 100 is released. As soon as the card lock 57 has moved out of the direction of movement of the card 100 the bias of the restoring spring 32 of the contacting apparatus 30 and, if necessary, also spring 65 provide that the card 100 is moved out of the housing 11 of the smart-card reader 10. This pushmatic characteristic simplifies for the user the removal of the card 100 out of the housing 11. A release as described above and a subsequent manual removal (without the aid of a spring force) of the card is also possible within the framework of the present invention.

Figure 6:
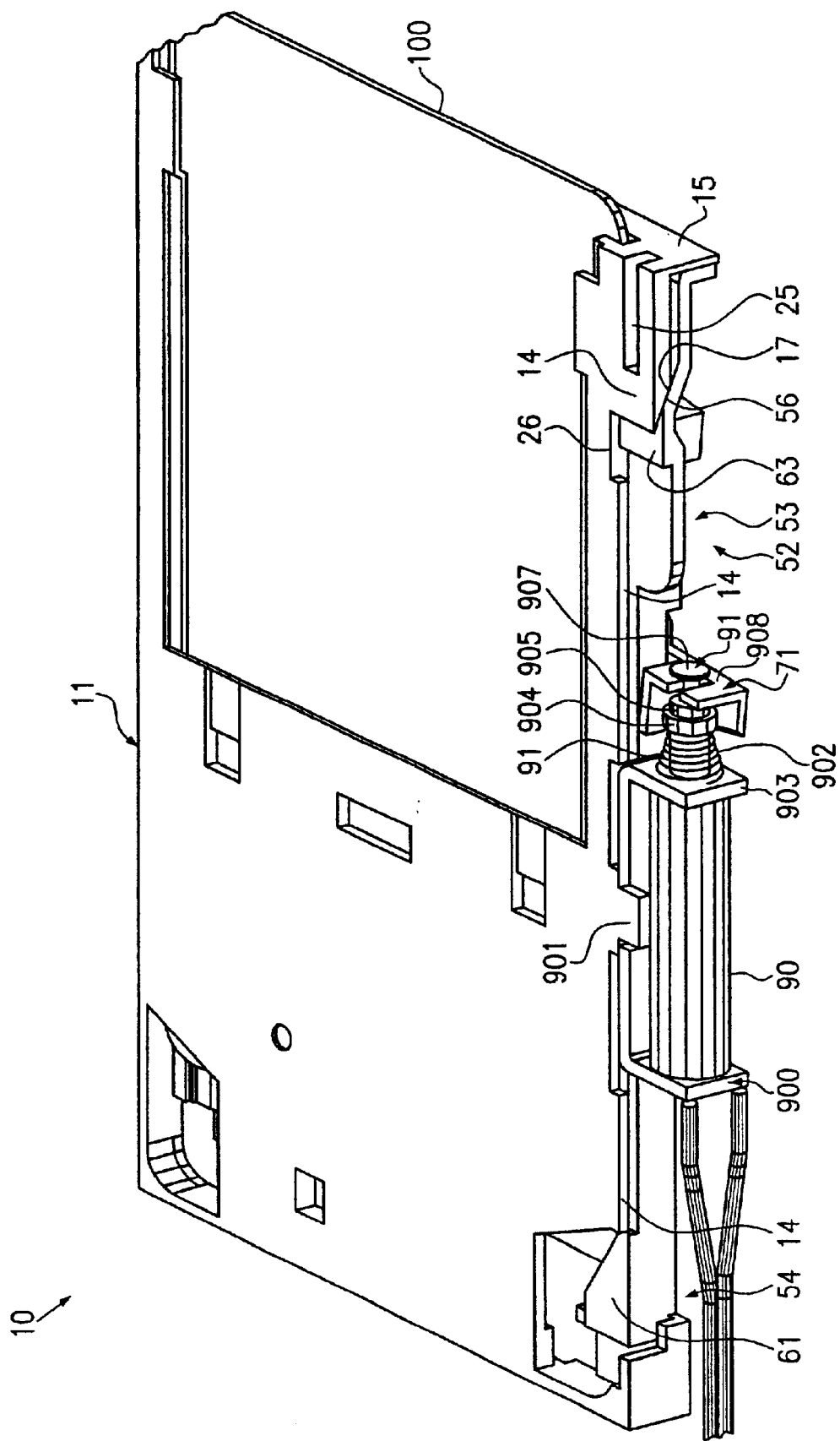
FIG. 6 is a perspective view of the smart-card reader of FIG. 1 under an angle from below, wherein the smart-card is in its released position.
Figure 7:
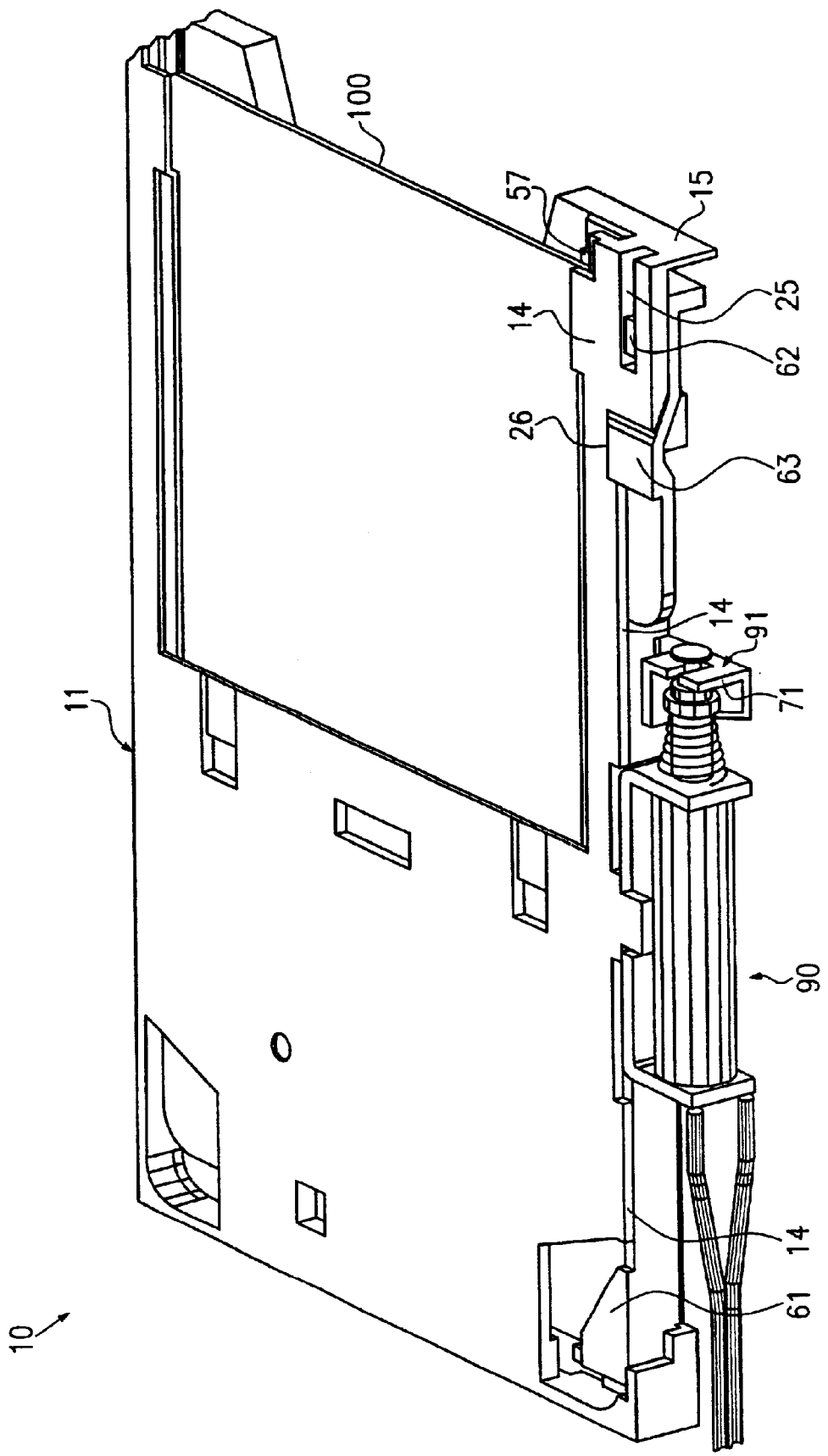
FIG. 7 is a perspective view of the smart-card reader of FIG. 1 similar to FIG. 6 with the smart-card being in the reading position.

FIGS. 6 and 7 show the smart-card reader 10 from below from an inclined position. An elongate guide opening 25 for the locking slide 52 extends in the forward guide surface 14 of the housing 11. The locking slide 52 comprises at its bottom side of its forward portion 52 a guide pin 62 which projects into the guide opening 25 by means of which the locking slide 52 is guided additionally during its relative movement.

Moreover, the housing 11 comprises at a rearward edge of the second inclined guide surface 17 a recess 26. Within the recess 26 a square shaped projection 63 of the locking slide 50 will be located when the locking slide 50 is in its locking position. The receipt of the projection 63 in the recess 26 of the housing 11 again guides the movement of the locking slide 52, extends the supporting surface of the second inclined surface 56 of the slide at the second inclined guide surface 17. Furthermore it allows a smaller design height of the mechanism for the upward and downward movement of the forward portion 53 of the locking slide 52, in particular of the card locking means 57 of the locking slide 52.

The Locking Lever Mechanism 51 of the Mechanical Locking Means 50

The locking lever mechanism 51 is, as mentioned above, located, seen in the direction of the insertion of the card 100, in front of the contacting apparatus 30 and above the inserted card 100. The locking lever mechanism 51 is in the form of a flat component and comprises the locking lever 66 and the wire spring 65. The locking lever 66 can be called a universal lever and is rotatably mounted at a rotary bearing 67 (preferably a pin provided at the housing 11) of the housing and extends substantially in the plane of the housing 11. The wire spring 65 is mounted at the housing 11 by spring holding means 18. One end of the wire spring 65 is mounted at a spring holder 68 at the locking lever 66 and the other end of the spring 65 is mounted at the locking slide 52 by means of a spring receiving means 58. The spring holding means 18 comprise a snap holder 23 as well as a guide drum 24. The wire spring 65 has the following three tasks:

1. restoring (reset) and biasing, respectively, of the locking slide 52 into the release position
2. biasing the locking lever 66 into the locking position, preferably against a locking switch 19 provided at the housing 11, so as to actuate said locking switch 19
3. securing the locking lever 66 against removal.

The locking lever 66 (see FIG. 4) comprises a plurality of lever arms. Thus, the locking lever 66 comprises a first arm 69. When the locking lever 66 is moved into the locking position, the first arm 69 will actuate the locking switch 19 provided at the housing 11. Said locking switch 19 provides an electrical indicator regarding the position within which the mechanical locking means 50 is currently positioned.

Moreover, the locking lever 66 comprises a locking nose 70. In case the locking slide 52 is moved into the reading position (which is equivalent to the locking position) by insertion of a smart-card, then, due to the biasing force provided by the wire spring 65, the locking lever 66 can rotate about the rotary bearing 67 whereby a locking surface 76 of the locking nose 70 comes into engagement with a locking slide locking surface 59 of the locking slide 52. This engagement blocks a return movement of the locking slide into the release position of the locking slide and arrests and locks, respectively, the locking slide in its locking position, which, as mentioned above, corresponds to the reading position.

Moreover, the locking lever 66 comprises a coupling fork 71. The fork 71 is adapted to receive an armature portion 91 of the release solenoid 90. The release solenoid 90 is mounted sideways with respect to the housing 11 with the locking slide 52 extending along the length of the release solenoid 90 between the release solenoid 90 and the housing 11. The release solenoid 90 helps to guide the locking slide 52 during its movement. Actuation of the release solenoid 90 (by energizing its coil) accelerates the magnet armature 91, which is preferably mounted for a reciprocal movement within the release solenoid 90.

The magnet armature 91 comes, after passing through an unimpeded path, in engagement with the coupling fork 71 of the locking lever 66 and causes a rotation or pivotal movement of the locking lever 66. This rotation of the locking lever 66 causes a pivotal movement of the locking nose 70, whereby the engagement of the locking surface 76 of the locking nose with the locking surface 59 of the locking slide 52 is released or removed and the locking slide is released for its movement into the release position. The provided unimpeded movement in the movement of the magnet armature has the purpose to reduce the energy requirements for unlocking the mechanical locking means by using the momentum of the mass of the magnet armature 91. Referring in particular to FIG. 6 it can be seen that the release solenoid 90 comprises a preferably U-shaped metal support bracket 900 which is fixedly mounted at lateral projections of the housing 11 one of which is shown at 901. The magnet armature 91 projecting on one side out of the release magnet 90 is held in the position of FIG. 6 by a pressure spring 902. The pressure spring 902 abuts on the one hand at an abutment surface 903 of the metal bracket 900 and the pressure spring 92 abuts on the other hand at an annular abutment surface of a spring abutment ring 904 which points leftward in FIG. 6. The armature 91 forms both the spring abutment ring 904 as well as adjacent thereto a fork abutment ring 905. The fork abutment ring 905 comprises an abutment surface pointing rightward in FIG. 6 which lightly abuts at an abutment surface 906 of the coupling fork 71 due to the pressure of the spring 902; said abutment surface 906 points leftward in FIG. 6.

The armature form further a head disk with an abutment surface extending leftward in FIG. 6 and being spaced from a rightward (see FIG. 6) pointing abutment surface 908 of the coupling fork 71. This distance between the left abutment surface (not referred to with reference numerals) of the head disk 97 as well as the abutment surface 908 allows for the above mentioned unimpeded movement. The pressure spring 902 is relatively weak but is sufficient to hold the armature 91 in the position shown in FIG. 6 in case the release solenoid 90 is not energized.

Moreover, the locking lever 66 is provided with an actuating lever 72. The actuating lever 72 pivots the locking lever 66 if it is actuated by hand. The manual actuation of the actuating lever can occur independently of an actuation by means of the release magnet 90. The actuation causes a movement of the locking nose 70 and thus to a corresponding release of the locking slide 52 and a release of the smart-card 100 as was described above in connection with the release solenoid 90. The actuating lever 72 provides for an emergency de-locking of the smart-card reader, for instance, in a situation where the power supply of the smart-card reader is interrupted and the solenoid 90 cannot be energized.

Moreover, the housing 11 is provided with first, second and third guide projections 20, 21 and 22. The bottom sides of these guide projections 20, 21 and 22 form guide surfaces which are in engagement with respective first, second and third preferably off-set locking lever guide surfaces 74, 73 and 75 of the locking lever 66. The pairs of overlying guide surfaces, placed on each other, serve the purpose to guide the locking lever 66 with its inventive flat design, during rotation at at least three guide points, and they make also an accidental removal of the locking lever 66 from its mounted position impossible.

The mechanical locking means 50, in particular the locking lever 66 and the locking slide 52, do not require any additional screws or other mounting elements, but all individual parts or components are installed by detent actions, form connections or by the components supporting each other.

The locking lever 66 carries out, according with the invention, a large number of diverse functions, e.g.: contacting the locking switch 19, locking and releasing the locking slide 52; and de-locking the mechanical locking means 50 responsive to an activation of the release solenoid 90 or to an actuation of the emergency de-locking lever 72 by hand. Inasmuch as different functions are combined, the universal lever with the locking lever 66 is designed relatively wide and thus has a great stability.

Operation

Below the operation of the smart-card reader will be summarized.

Locking of the Card 100

The smart-card 100 is slideably inserted into said housing 11. During insertion, the contact support 31 is moved rearward by the smart-card 100 and the contact elements 34 come into contact with the contact zones of the smart-card 100. Shortly before the smart-card 100 reaches the final reading position, the card receiving means 61 of the locking slide 52 comes into engagement with the card and moves the locking slide 52 rearward relative to the housing 11. The slide 52 comes into abutment with the inclined surface 16 of the housing 11, whereby the card locking means 57 moves downward in front of the card 100, such that the chip card 100 is locked in the reading position. At the same time the biased locking lever 66 is released for a rotation into the locking position, whereby the locking nose 70 is moved into abutment with the locking nose projection 59 of the slide 52 and thus locks the locking slide 52.

Release of the Card 100

By actuating the actuating lever 22 for the emergency de-locking or by actuating the release solenoid 90, the locking nose 70 will be moved out of engagement with the locking slide 52. The biased locking slide 52 can thus move into its initial or start position. Due to a movement of a portion of the locking slide against the inclined surface 17 the card locking means 57 moves upwardly and releases the locking of the smart-card 100. The tension of the restoring spring 32 then leads to a movement of the card 100 into the card release position.

What is claimed is:

1. A smart-card reader adapted to receive and lock a smart-card in a locking position, said smart-card reader comprising:

a housing having oppositely arranged longitudinally extending side surfaces, a contacting apparatus movable, glideable, pivotable carrying contact elements adapted to contact respective smart-card contacts of the smart-card in a reading position of said smart-card in said housing, mechanical locking means for locking and releasing the smart-card, wherein the mechanical locking means comprises a locking slide and a locking lever mechanism, wherein a) the locking slide extends longitudinally and outside of a perimeter of the smart-card and of the housing and alongside one of said side surfaces, and wherein b) the locking lever mechanism locks the locking slide in a locked reading position and is located, seen in the direction of the smart-card insertion in front of the contacting apparatus and above the smart-card.

2. Smart-card reader of claim 1, wherein the locking lever mechanism comprises a locking lever which locks and de-locks, respectively, the smart-card located in the reading position by engagement with the locking slide in the smart-card reader.

3. Smart-card reader of claim 2, wherein the locking lever comprises a plurality of lever arms to which a plurality of functions are assigned.

4. Smart-card reader of claim 2, wherein the locking lever provides for one or more of the following functions:

actuating a locking switch in the locking position, locking and releasing the locking slide, de-locking the mechanical locking means by actuation of an emergency de-locking lever.

5. Smart-card reader of claim 2, wherein the locking lever mechanism and the housing each comprise guide surfaces which are overlying each other and guide the locking lever during rotation of the locking lever about an axis.

6. Smart-card reader of claim 2, wherein the locking lever comprises a locking nose, which locks the locking slide in the locking position after the locking slide is moved into the locking position.

7. Smart-card reader of claim 2, wherein the locking lever mechanism comprises spring means, in particular a wire spring which is mounted at the housing and at the locking lever and wherein the locking lever is biased by said spring means into the locking position.

8. Smart-card reader of claim 7, wherein the wire spring is in engagement with the locking slide and biases the locking slide into the de-locked position.

9. Smart-card reader of claim 2, wherein the locking lever comprises an actuating lever which releases the engagement of the locking lever with the locking slide and thus allows a direct manual de-locking.

10. Smart-card reader of claim 2 comprising a release solenoid which extends along and outside of the housing.

11. Smart card reader of claim 10, where the locking slide extends between the housing and the release solenoid.

12. Smart-card reader of claim 10, wherein the locking lever is coupled to the release solenoid so as to release the locking slide and thus provide for a de-locking of the smart-card.

13. Smart-card reader of claim 10, wherein the release solenoid comprises a pull-operated magnet armature and a restoring or reset spring.

14. Smart-card reader of claim 13, wherein the magnet armature executes an unimpeded movement prior to the magnet armature engaging a coupling fork of the locking lever during movement of the locking lever so as to reduce the amount of energy required for the de-locking.

15. Smart-card reader of claim 14, wherein the electrical operation of the magnet armature provides for the regular de-locking of the mechanical locking means while a mechanical emergency de-locking is provided by actuating the actuating lever by hand.

16. Smart-card reader of claim 1, wherein the mechanical locking means is of a flat design and all components of the mechanical locking means are mounted without additional mounting means by detent functions, form connections and by supporting each other.

17. Smart-card reader of claim 1, wherein the locking slide comprises a forward and a backward end portion, and wherein in the reading position after the smart-card has been inserted, the smart-card is in engagement with the rearward end portion of the locking slide and has moved said locking slide along its longitudinal direction backward towards the locking position, whereby the forward end portion of the locking slide has been lowered and card locking means has been brought in engagement with the smart-card so as to lock said smart-card.

18. Smart-card reader of claim 1, wherein the locking slide is guided in relative movement to the housing by means of guide elements provided at the housing, by means of guide surfaces, and by a stopper.

19. Smart-card reader of claim 1, wherein the locking lever comprises an actuator which operates or actuates a locking switch located at the housing so as to indicate the locked or de-locked condition of the smart-card reader.

20. Smart-card reader of claim 1, wherein the locking slide is a single-piece member and extends along the length of the smart-card.

21. Smart-card reader of claim 1, wherein the rearward portion of the locking slide is located adjacent to the smart-card reading position in the locking position as well as in the released position.

22. Smart-card reader of claim 1, wherein the contact apparatus is directly actuated by the smart-card.

23. Smart-card reader of clam 1, wherein the locking slide comprises smart-card locking means at a forward portion of the locking slide for locking the smart-card.

24. Smart-card reader of claim 1, wherein the housing and the locking slide comprise two spaced pairs of inclined surfaces which are in engagement with each other and which guide the card lock during relative movement of the card lock into locking or release positions.

25. A smart-card reader adapted to receive and lock a smart-card in a locking position, said smart-card reader comprising:

a housing having oppositely arranged longitudinally extending side surfaces, a contacting apparatus reciprocally mounted in said housing between an insert position and a lower reading position, in which smart-card contacts of a smart-card can be contacted said contacting apparatus being biased into said insert position and being adapted to be moved by insertion of said smart-card from said insert position to said reading position, a locking slide reciprocally mounted at one of said side surfaces outside and alongside said housing, said locking slide having card-receiving means adapted to be contacted during the insertion of said smart-card and during the movement of said contacting apparatus from said insert position to said reading position, said locking slide further comprising at a forward end of the locking slide smart-card locking means projecting inwardly and downwardly so as to lock the smart-card in a smart-card reading position, said locking slide being biased into a release position, and a locking lever pivotally mounted in a direction towards the forward end of the smart-card reader in front of the contacting apparatus and adapted to lock said locking slide in a locking position.

26. Smart-card reader of claim 25, wherein the locking lever can be actuated by a release solenoid and/or by a manual actuation.

27. Smart-card reader of claim 26, wherein a single wire spring is provided, which biases the locking slide into said release position and also biases the locking lever into said locking position.

28. Smart-card reader of claim 26, wherein said locking lever comprises three arms, one arm adapted for co-operation with said solenoid, a second arm adapted for being actuated manually to release said card from said smart-card reading position and a third arm adapted to actuate a switch, for indicating the presence of a card in the smart-card reader.

* * * * *